No. 741,090. PATENTED OCT. 13, 1903.
J. F. ZIEGLER.
FILTER.
APPLICATION FILED SEPT. 27, 1902.
NO MODEL. 3 SHEETS—SHEET 1.
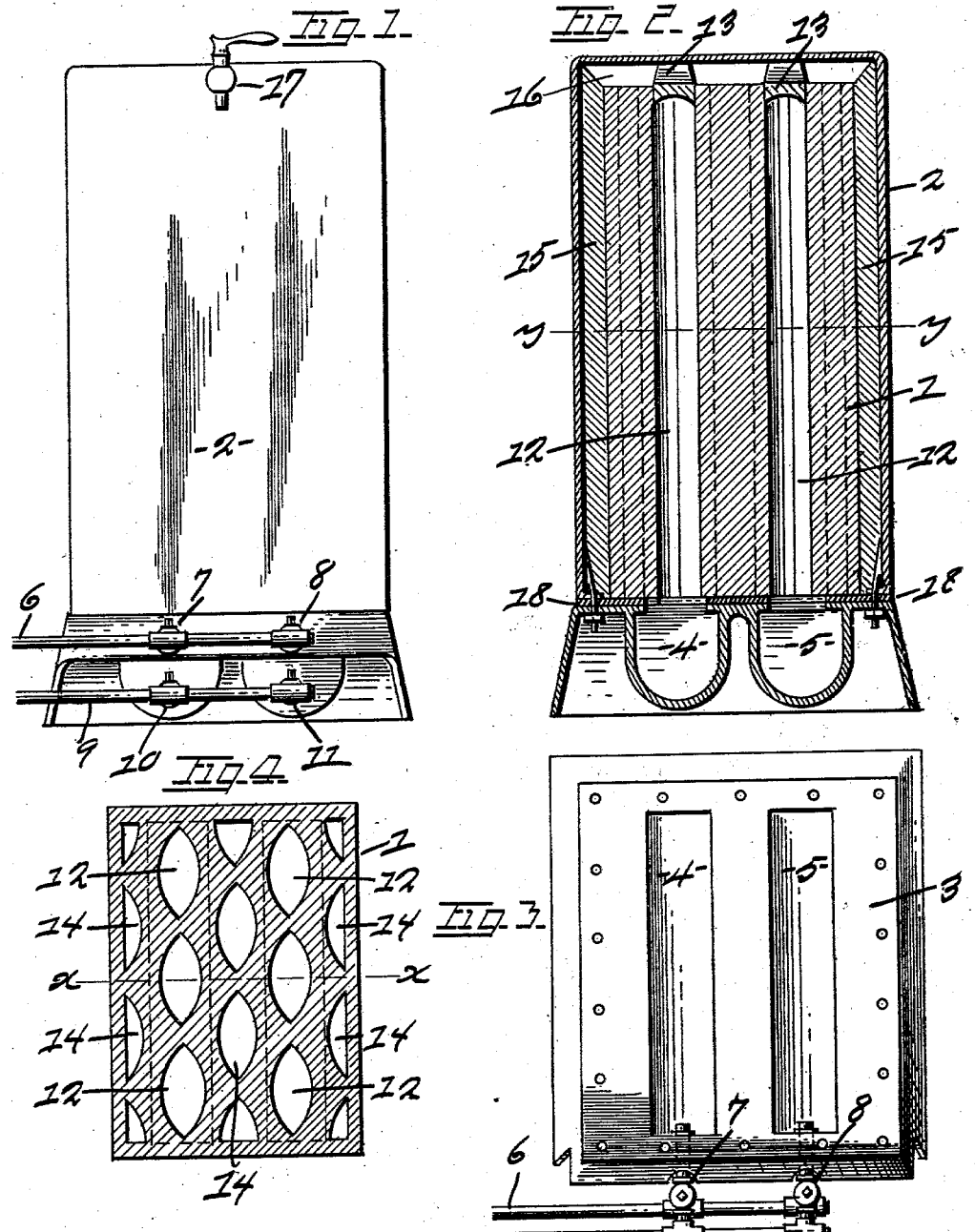

No. 741,090. PATENTED OCT. 13, 1903.
J. F. ZIEGLER.
FILTER.
APPLICATION FILED SEPT. 27, 1902.
NO MODEL. 3 SHEETS—SHEET 2.
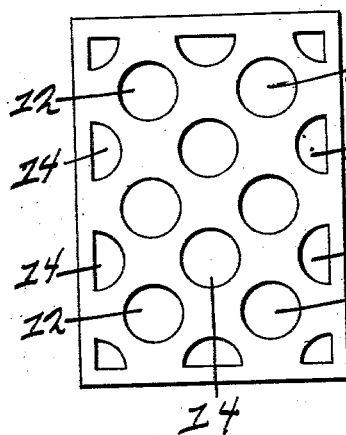
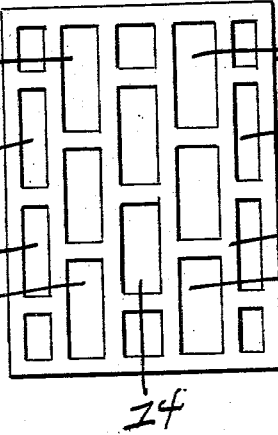
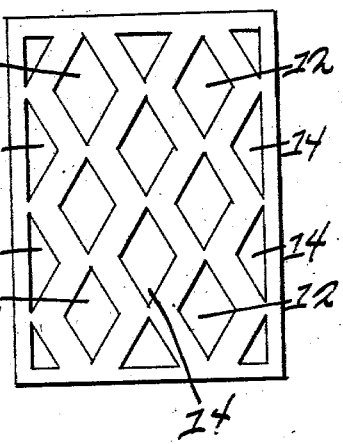

No. 741,090. PATENTED OCT. 13, 1903.
J. F. ZIEGLER.
FILTER.
APPLICATION FILED SEPT. 27, 1902.
NO MODEL. 3 SHEETS—SHEET 3.

WITNESSES INVENTOR

No. 741,090. Patented October 13, 1903.

UNITED STATES PATENT OFFICE.

JOHN F. ZIEGLER, OF TOLEDO, OHIO.

FILTER.

SPECIFICATION forming part of Letters Patent No. 741,090, dated October 13, 1903.

Application filed September 27, 1902. Serial No. 125,033. (No model.)

*To all whom it may concern:*

Be it known that I, JOHN F. ZIEGLER, a citizen of the United States, residing at Toledo, in the county of Lucas and State of Ohio, have invented certain new and useful Improvements in Filters; and I do hereby declare the following to be a full, clear, and exact description of the invention, such as will enable others skilled in the art to which it appertains to make and use the same.

My invention has reference to a filter in which the water or other liquid is purified by being forced under pressure through the porous walls of a block of filtering material; and it involves in its construction the employment of a plurality of independent filtering units, the filtering medium in any of which may be cleaned by reversing the flow of liquid thereto.

My invention contemplates improvements in the form and arrangement of the blocks of filtering material whereby a maximum capacity is insured and I have especially arranged said filtering-blocks to withstand the great pressure to which they are subjected.

My invention further consists in certain novel features in the construction and arrangement of the parts of the filter, and pertains particularly to the means employed for cleaning the various filter units, as is hereinafter shown, described, and claimed.

Figure 8:
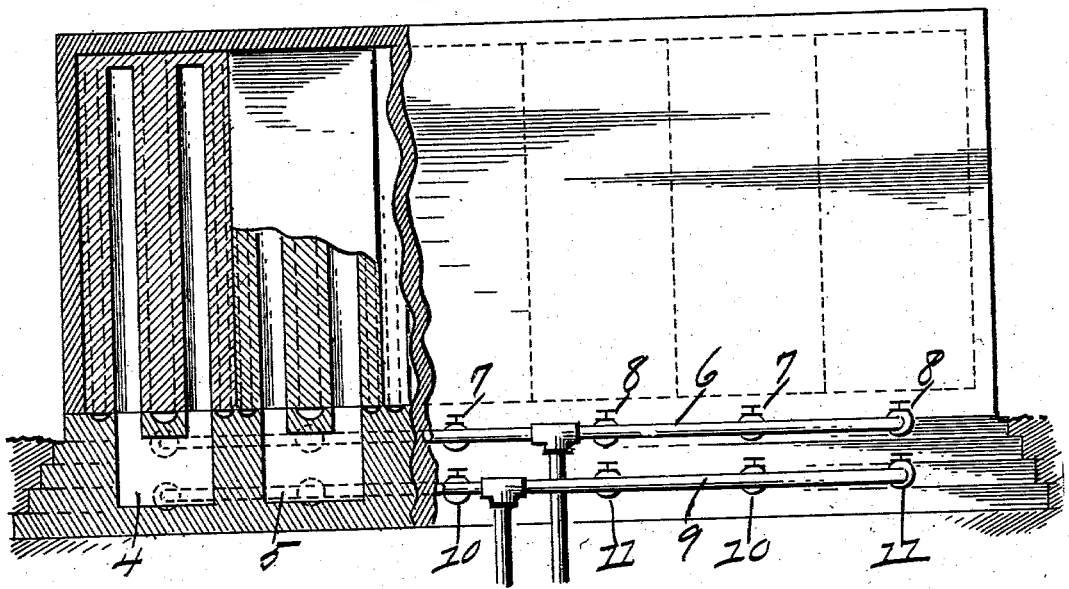
Figure 9:
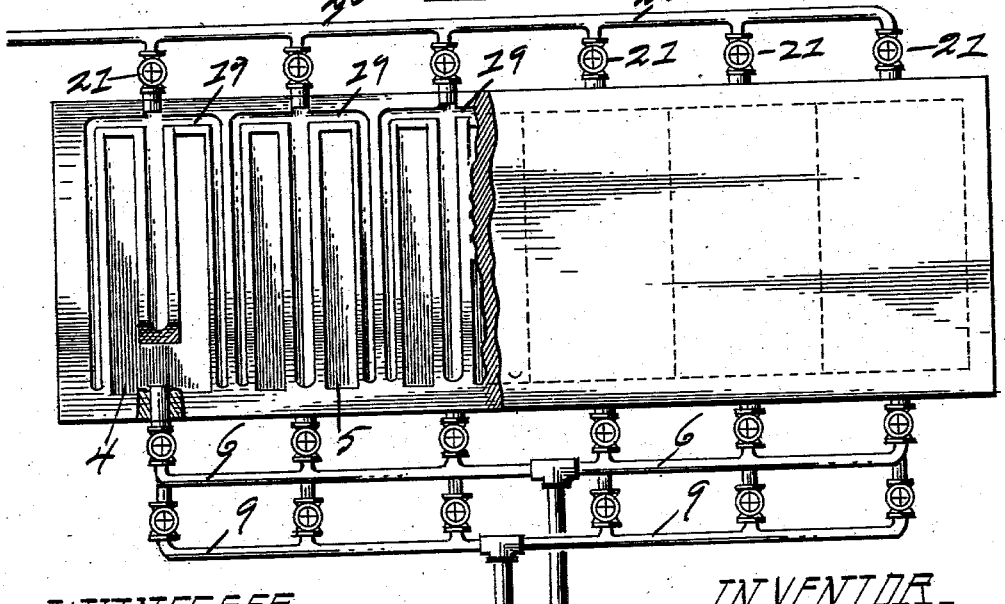

In the accompanying drawings, Figure 1 is a front elevation of my filter arranged for domestic use. Fig. 2 is a vertical section through the same, the section through the block of filtering material being indicated by the line $x\ x$, Fig. 4. Fig. 3 is a plan view of the filter-base, showing the mud-pockets therein. Fig. 4 is a section through the filtering-block on line $y\ y$, Fig. 2. Figs. 5, 6, and 7 are bottom plan views, respectively, of filter-blocks, showing modified forms of passages therethrough. Fig. 8 is an elevation, partly in section, showing my filter arranged for filtering a large quantity of water; and Fig. 9 is a plan view of the same also partly in section.

In the drawings, 1 indicates a filter-block constructed of any suitable filtering material, such as natural stone, having a porous formation or baked clay, the blocks being formed into the desired shape while the clay is still in a plastic condition.

Surrounding the filter-blocks at the sides and top is a containing-case 2, the bottom of said case being open to receive the filter-block.

3 is a base for the filter, adapted to be bolted or otherwise secured to the case 2, the same being provided with parallel and independent mud-pockets 4 and 5, respectively.

6 is a feed-pipe carrying water under pressure in an unfiltered state, and said feed-pipe communicates with the pockets 4 and 5, the discharge of the water into said pockets being controlled by means of suitable valves 7 and 8, respectively.

9 is a pipe adapted to conduct the muddy wash-water from the mud-pockets into a catch-basin or other convenient receptacle therefor, the outflow from the mud-pockets being controlled by suitable valves 10 and 11. The blocks of filtering material which are employed in carrying out my invention are each provided with a plurality of vertical passages 12, which communicate at their lower ends with the pockets in the base 3. The upper ends of said passages are closed by any suitable means, as shown at 13, Fig. 2. In like manner there are provided in the filter-blocks a plurality of vertical passages 14, arranged parallel to the passages 12 in proximity thereto. It is to be observed that the various passages are arranged in alternate rows extending from the front to the rear of the filter to conduct the filtered and unfiltered water, respectively. The adjoining walls of the various passages are in the form of arches to withstand the pressure of the water contained therein. In assembling the filter, referring to Figs. 1, 2, 3, and 4, the block of filtering material is placed in position within the case, the upper ends of the passages 12 having been previously closed. The interspace between the block and the case is filled with cement, (indicated at 15,) which after hardening firmly holds the block in place. When the block is secured within the case, there will be space 16 at the top of the case above the block with which the passages 14 communicate.

17 is a faucet to withdraw the water from the space 16. The case, with the filter-blocks secured therein, as has been described, is mounted upon the base and firmly bolted or otherwise secured thereto, a gasket 18 of suitable resilient material being provided between the meeting faces of the case, the block, and the base. Said gasket serves not only to prevent leakage of water from the mud-pockets in the filter-base, but also securely seals the lower ends of the passages 14, so that the discharge from said passages will be upward into the space 16.

The operation of the filter is as follows: The unfiltered water is carried under pressure by the feed-pipe 6 into the pockets provided in the base, the valves 7 and 8 being open. The valves 10 and 11 are closed to prevent the discharge of water from the mud-pockets into the pipe 9. The water is carried upward under pressure into the passages 12, which communicate with the pockets in the filter-base, and the same is forced through the porous walls of the filter-block and is carried upward by the passages 14 into the space 16, from whence it is drawn in a filtered state by means of the faucet 17. After the filter has been in operation for some time the capacity is greatly reduced, owing to the deposit of impurities upon the walls of the passages 12. The removal of these accumulated impurities is most efficiently accomplished by reversing the flow of water through the filtering medium. I have provided in my filter a means for carrying on the cleaning operation simultaneously with the filtering operation. When the quantity of water passing through the filter is retarded and it becomes apparent that the filter requires cleaning, the valve 8 is closed, thereby cutting off the supply of water from the pocket 5, and the valve 11 is at the same time opened to allow the water from said pockets to escape into the pipe 9. The left half of the filter-block will therefore continue to filter water, whereas the right half will be inactive. The filtered water contained in the space 16 being under pressure, the same will again return through the filtering medium and discharge into the passages 12 on the right, carrying the accumulated impurities therewith and depositing the same into the mud-pocket 5. The passages 12 on the right having now been cleaned, the valve 8 is again opened and the valve 11 closed, as they were at the beginning of the cleaning operation. The left side of the filter is now cleaned in a similar manner, the right side continuing to filter water while the operation is progressing. The deposit of impurities in the mud-pockets may be quickly removed by flushing said pockets, the valves admitting water into the pockets and also those permitting the discharge from said pockets being opened for this purpose. In Figs. 8 and 9 is illustrated a filter plant of large capacity involving in its construction a plurality of filtering units, the arrangement and operation of which are substantially the same as that hereinbefore described. Where the filter is arranged as illustrated, the base of the same is constructed of masonry with pockets formed therein, and the blocks of filtering material are arranged over the pockets the same as in the domestic filter which I have already described. Instead of discharging at the top, as in the smaller filter, the passages carrying filtered water are closed at their upper ends and communicate at their lower ends with channels 19, which may be provided in the masonry base. The filtered water from each unit is discharged into a main delivery-pipe 20, the discharge from each unit being controlled by means of suitable valves 21.

Having described my invention, what I claim, and desire to secure by Letters Patent, is—

1. In a filter, a case provided in its base with a plurality of pockets, valve-controlled inlet and discharge pipes connecting with each pocket, a porous block of filtering material secured within the case having passages for unfiltered water closed at their upper ends and communicating at their lower ends with the pockets in the base, and also having passages for filtered water closed at their lower ends and discharging at the top, substantially as described.

2. In a filter, a base having elongated parallel pockets open at the top and having valve-controlled inlet and discharge pipes connecting with one end of each pocket, a block of filtering material arranged upon the base having a plurality of passages for unfiltered water closed at the top and communicating at the bottom with the pockets, and also having passages for filtered water adjacent to the other passages which are closed at the bottom and discharge at the top, a case surrounding the block of filtering material mounted upon the base and provided at the top above the block of filtering material with a space to receive the filtered water, and a packing by which tight joints are formed between the meeting faces of the base, the case and the block of filtering material, substantially as described.

3. In a filter, an outer casing, a block of filtering material secured therein provided with a plurality of parallel upright passages, adapted to carry filtered and unfiltered water respectively, the relative arrangement of the passages being such that each passage carrying unfiltered water will be immediately surrounded by a plurality of passages carrying filtered water, mud-pockets communicating with the passages carrying unfiltered water, valve-controlled inlet-pipes adapted to admit water independently to each of the mud-pockets, valve-controlled discharge-pipes adapted to permit the discharge of water independently from said mud-pockets, and a valve-controlled outlet leading from the filtered-water passages, all of said pipes being arranged for the purpose of cleaning the filter substantially as shown and described.

4. A filter-block for employment in a filter, constructed of porous material, having upright parallel passages arranged with reference to their transverse section in intersecting diagonal rows, each alternate passage of said rows being adapted to carry filtered and unfiltered water respectively, and each passage carrying unfiltered water being by this arrangement immediately surrounded by a plurality of passages for carrying filtered water, substantially as shown and described.

In testimony whereof I hereunto affix my signature in presence of two witnesses.

JOHN F. ZIEGLER.

Witnesses:
 CARL H. KELLER,
 ERNEST F. ZIEGLER.